(12) United States Patent
Herndon et al.

(10) Patent No.: US 6,762,529 B2
(45) Date of Patent: Jul. 13, 2004

(54) LAMINATION FEATURES FOR STATOR GROUNDING

(75) Inventors: Troy M. Herndon, San Jose, CA (US); Jeffry A. LeBlanc, Aptos, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/865,240

(22) Filed: May 24, 2001

(65) Prior Publication Data

US 2002/0047344 A1 Apr. 25, 2002

Related U.S. Application Data

(60) Provisional application No. 60/207,890, filed on May 25, 2000.

(51) Int. Cl.[7] .............................. H02K 3/00; H02K 7/14; H02K 11/00
(52) U.S. Cl. ........................ 310/216; 310/67 R; 310/71; 310/45
(58) Field of Search ............................ 310/42, 71, 216, 310/217, 91, 254, 259, 67 R, 43, 45; 29/596–598; 360/99.08, 98.07, 99.04

(56) References Cited

U.S. PATENT DOCUMENTS

| | | | | |
|---|---|---|---|---|
| 4,760,298 A | * | 7/1988 | Kitahara et al. | 310/67 R |
| 5,170,086 A | * | 12/1992 | Wrobel et al. | 310/217 |
| 5,965,966 A | * | 10/1999 | Aiello et al. | 310/232 |
| 6,265,802 B1 | * | 7/2001 | Getschmann | 310/216 |

* cited by examiner

Primary Examiner—Tran N. Nguyen
(74) Attorney, Agent, or Firm—Moser Patterson & Sheridan

(57) ABSTRACT

A spindle motor incorporates a shaft having a known outer diameter and a stator having a known inner diameter which is slightly larger than the outer diameter of the shaft so that it may slip over the shaft. Die cut sharp features are defined in the inner diameter of the stator laminations. These features extending radially inward from the generally circular inner diameter of the stator laminations so that these features establish an interference fit with the outer surface of the shaft which the structure is mounted. When the stack is pressed onto the outer surface of the shaft to which it is mounted and supported, the coating on the stack will scrape off, thus establishing a metal-to-metal contact between the stack and the adjoining outer surface of the shaft. As a result of this, a tight interference fit will be established between the inner surface of the stack and the outer surface of the shaft, thus both radially fixing the stack on the shaft, and grounding the stack to the shaft.

9 Claims, 4 Drawing Sheets

LAMINATION FEATURES FOR STATOR GROUNDING

CROSS-REFERENCE TO RELATED APPLICATIONS

This application claims benefit of United States provisional patent application Serial No. 60/207,890, filed May 25, 2000 and entitled "Lamination Features for Stator Grounding", which is herein incorporated by reference.

FIELD OF THE INVENTION

The present invention is directed generally to the field of disc drives, and more particularly, to an improved assembly for the spindle motor of a disc drive.

BACKGROUND OF THE INVENTION

Winchester disc drives are used in computers to store increasingly larger amounts of information. A typical Winchester disc drive is a system with a limited number of mechanical parts, including a spindle motor which mounts one or more discs for constant speed rotation, and an actuator carrying a transducer at one end and a voice call motor at the other, and the operable and response to commands to the voice call motor to position the transducer over a selected track on a disc to read and write data.

As one of the most expensive elements in the disc drive, as well as one of the largest and most mechanically complex, many design efforts are intended to minimize the cost and ease of the assembly of the spindle motor. This particular invention is especially directed to improving spindle motor design to incorporate means for grounding the laminations of the stator stack to the shaft while centering the stator stack on the shaft so that it continues to be properly aligned with the magnet supported on the hub which is rotating outside the stator. The need to properly ground the stator stack is long standing and well-established, owing especially to the use of transducers which are increasingly sensitive to any stray electrical fields. Prior efforts to solve this problem, including the separate clip shown in U.S. Pat. No. 5,965,966 incorporated herein by reference, add an additional part to the assembly sequence, and are therefore both expensive and lack the desired level of reliability.

SUMMARY OF THE INVENTION

Therefore, it is an object of the present invention to provide an improved spindle motor design of a type especially for use in the disc drive.

A related and more specific objective of the invention is to provide a simplified design for installation of the stator stack over the shaft while effectively grounding the stator stack to the shaft.

Another objective of the invention is to provide means, method and apparatus for fixing the stack on the shaft through radial interference while successfully grounding the stack to the shaft.

Yet another objective of the invention is to minimize the cost of assembling the stack on the shaft, while still electrically grounding the stator stack to the shaft.

These and other objectives of the invention are provided in a spindle motor incorporating a shaft having a known outer diameter and a stator having a known inner diameter which is slightly larger than the outer diameter of the shaft so that it may slip over the shaft. Die cut sharp features are defined in the inner diameter of the stator laminations. These features extending radially inward from the generally circular inner diameter of the stator laminations so that these features establish an interference fit with the outer surface of the shaft which the structure is mounted. When the stack is pressed onto the outer surface of the shaft or base extension to which it is mounted and supported, the coating on the stack will scrape off, thus establishing a metal-to-metal contact between the stack and the adjoining outer surface of the shaft, as a result, a tight interference fit will be established between the inner surface of the stack and the outer surface of the shaft, thus both radially fixing the stack on the shaft, and grounding the stack to the shaft.

Other features and advantages to the present invention will be better understood by reference to the following figures, and the detailed description of the exemplary embodiments given in conjunction with those features.

DETAILED DESCRIPTION OF THE PREFERRED EMBODIMENT

Figure 1:
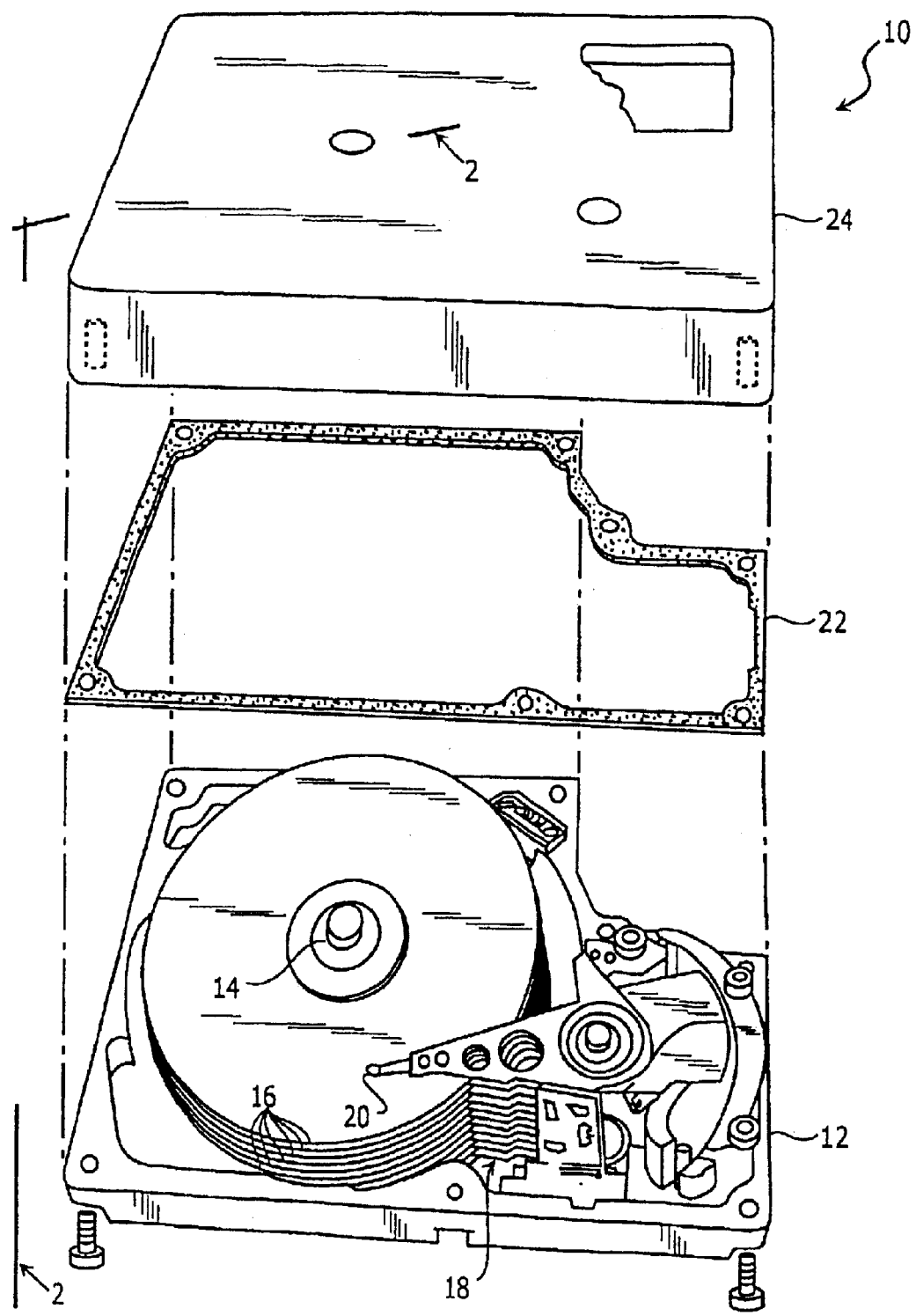
FIG. 1 is an exploded view of a disc drive in which the present spindle motor with stator stack is useful.

FIG. 1 is an exploded perspective view of a magnetic disc drive storage system in which the present motor and stator grounding design could be used. Of course, the stator grounding design of the present invention is not limited to use with a particular design of motor. Rather, given the advantages the invention achieves, it could be useful in many motor designs where electrical grounding of the stack to the shaft is a critical feature, while maintaining accurate radial and axial alignment of the stator mounted onto the shaft.

In this particular example of FIG. 1, the storage system 10 includes a housing base 12 adding a spindle motor 14 which carries storage discs 16. Armature assembly 18 moves transducers 20 across the surface of the discs 16. The environment of this discs 16 is sealed by seal 22 and cover 24. In operation, discs 16 rotate at high speed while transducers 20 are positioned at any one of a large number of radially differentiated tracks on the surface of the discs 16. This allows the transducers to read and write mathematically encoded information on the surface of disc 16 at selected locations. The discs rotate at very high speeds, several thousand rpm, in order to maintain the transducers flying over the surface of the discs. In present day technology, the spacing distant between the transducer and the rotating discs surface is measured in micro inches; thus, it absolutely essential that the spindle motor be reliable in operation in terms of maintaining constant speed of operation while not being susceptible to vibration or misalignment of the stator stack relative to the magnet.

It is further essential that the stator stack be grounded to the shaft, so that no stray electrical fields are set up which could damage or hinder the long-term reliable operation of the transducer.

Figure 2:
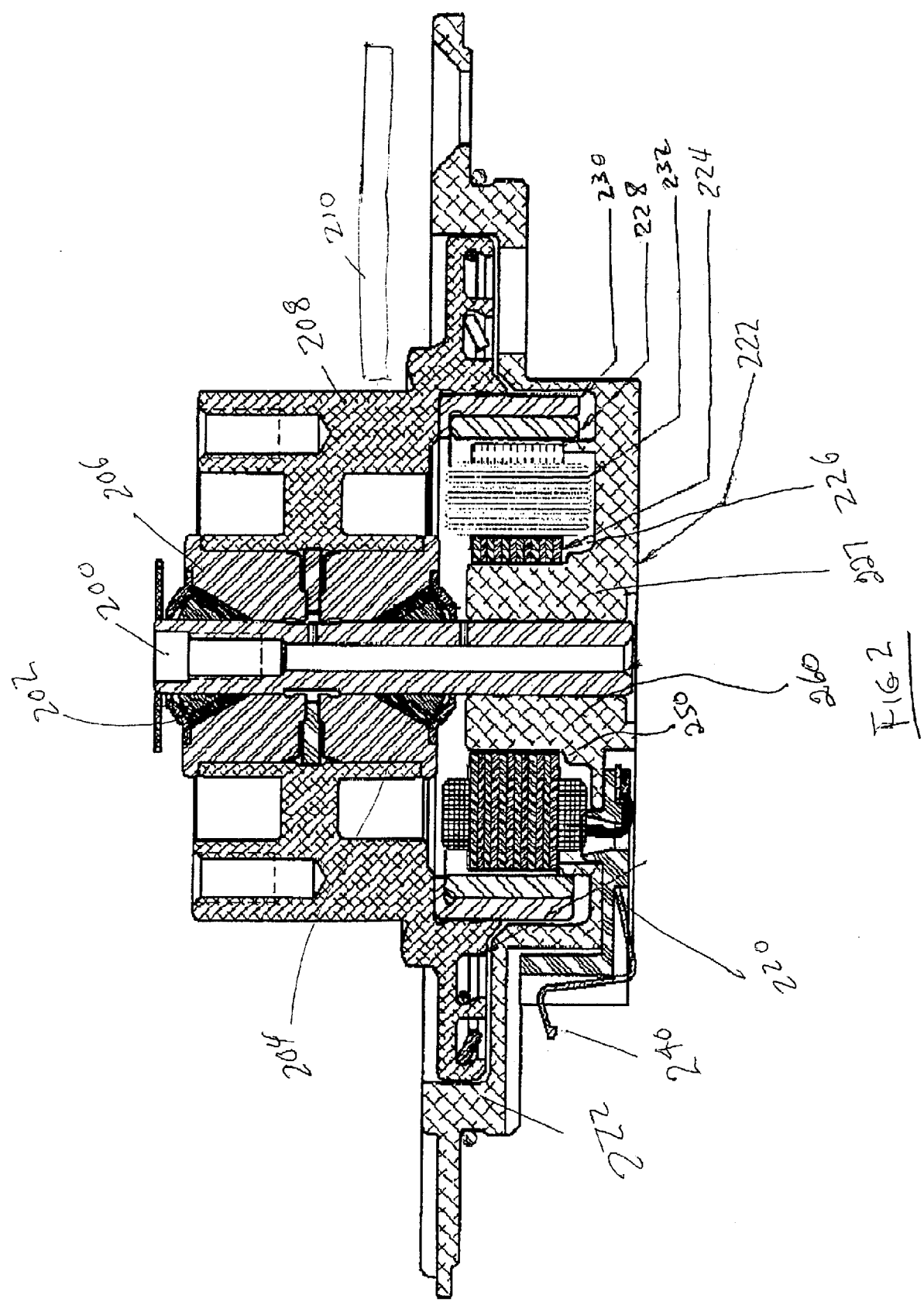
FIG. 2 is a vertical sectional view of a spindle motor designed in accordance with the present invention showing the stator stack in place on the base.

Therefore, referring next to FIG. 2, the figure shows the primary pieces of an exemplary motor in which one embodiment of the present invention can be used to mount and electrically ground the stator to the shaft. As shown, the shaft 200 uses a pair of conical hydrodynamic bearings 202, 204 to support a sleeve 206 which in turn supports a hub 208 for rotation around the shaft. The hub supports one or more discs 210, for rotation when the motor 220 which is supported in the base 222 along with the shaft 200 is energized. The motor in its most basic form comprises stator laminations 224 which are supported in a recess 226 defined by shoulders 227 the base frame 222; the stator faces a magnet 228 supported from a backiron 230 which in turn is supported from the hub 208. Energization of the stator coils 232 which are supported on the lamination stack 224 creates a field which cooperates with the magnet 228 to cause rotation of the hub around the shaft.

Electrical connections brought in by wires 240 run to the several phases of the stator coils 232 to provide the necessary signals to energize the motor and cause rotation of the hub. As can be seen from FIG. 2, the alignment of the stack 224 relative to the magnet 228 must be maintained over the life of the motor in order to cause proper interaction between the stator coils 232 and the magnet 228. Further, due to the many electrical signals brought into the stator coils, proper grounding of the stator laminations to the frame or base 222 is also essential. It is for this purpose that the lamination feature shown both clearly in FIG. 3 have been adopted.

Figure 3:
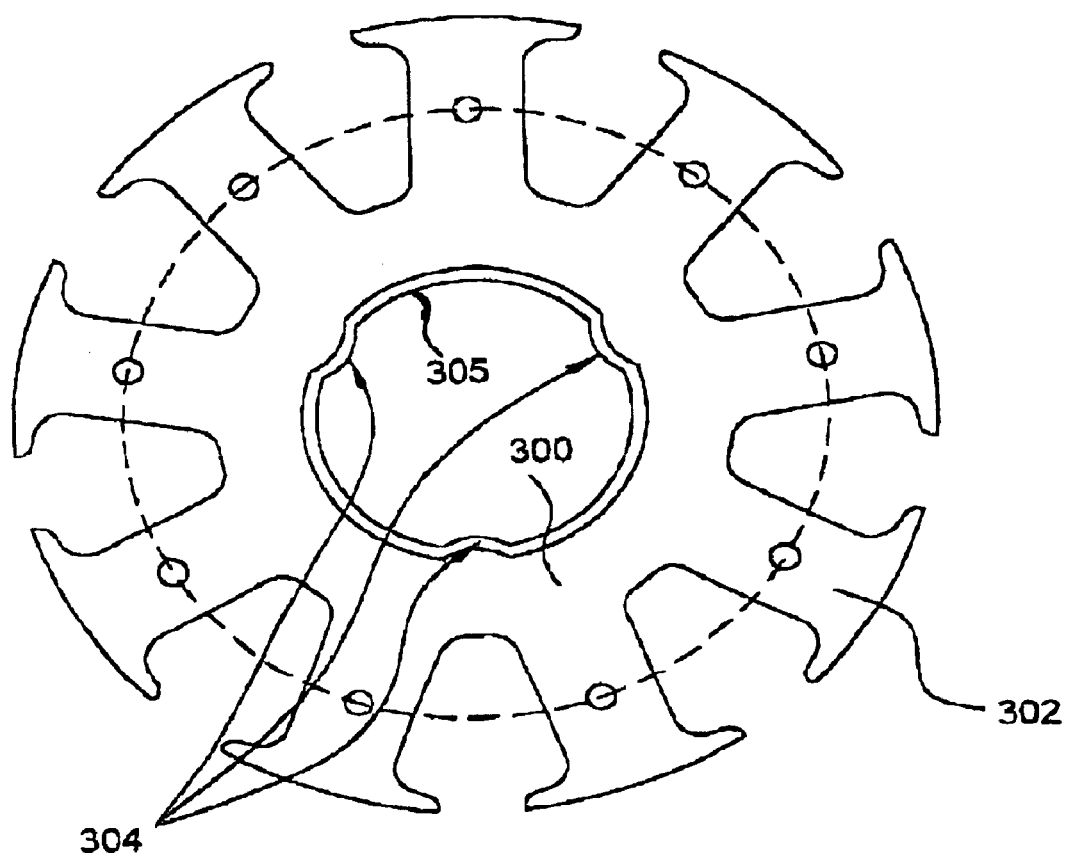
FIG. 3 is a top plan view of the stator stack illustrating the features defined on the inner diameter of the stator stack.

Referring next to FIG. 3, shown here is a plan view of the lamination stack 224, of a relatively standard configuration including an inner yoke 300 and a plurality of teeth 302 on which the stator coils will be wound. Also shown in this figure are the lamination features 304 which extend radially inward from the inner yoke 300 and comprise a means for grounding the stator to the shaft and/or base. The inner diameter 300 of the inner yoke is typically about 9 mm; each of these added features is about 0.5 mm in radial extent and about 1.5 mm circumferentially. In this particular design, three such features 304 are so shown in order that when the stator is pressed over the shaft, sufficient features are provided that the stator can be reliably press located over the surface of the shaft. Therefore, it may become desirable to provide more features than three.

The use of these features 304 eliminates the stator grounding clip which is typically used to cut into the e-coating which is provided over the stator laminations. Eliminating this coating ensures grounding of the lamination stack against the conductive surface of the shaft. As shown, the features are rounded; but they may come to a sharper point if such a point can meet the objective of scraping a sufficient amount of the coating off the surface of the features 304 to provide an electrically conductive contact between the lamination stack and the outer surface of the shaft. The inner diameter of the yoke 300 is chosen to be only very slightly larger than the outer diameter of the shaft 200 or base shoulders 227 so that especially with the provision of the features 304, a tight interference fit between the lamination stack and the outer surface of the shaft or base is achieved.

As seen, as the stack is pushed over the surface of the shaft or base, the interference fit with the sharp features 304 will cause the e-coating to be scraped off the ends and sides of the lamination features 304. Thus, stator grounding is achieved with no additional parts or associated costs.

An additional advantage of this invention is that it is very easy to add the features to the lamination stack 304 simply by modifying the existing dye which is used to cut the lamination stack. The outline of the features simply needs to be cut into the outer surface of the die, eliminating some material from the die and in no way otherwise disturbing of the configuration or utilization of the die. The lamination stack die and the resulting stack is already designed to create an interference fit to the structure with which it is mounted. Therefore, as the stack is pressed onto the adjoining structure, the e-coating, which had previously been sprayed onto the stack, is scraped off.

This interference fit can easily and positively establish the axial location of the stator along the shaft, especially if the stack is sized to rest against a shoulder 250 (as shown in FIG. 2) which may be defined on either the base or the shaft itself. In this way, one end of the stack rests against the shoulder 250; any movement of the stack away from that location is prevented by the fact that the features 304 have been bent upward away from the shoulder 250 as the stack is pushed over the outer surface of the shaft or base recess 260 as shown in FIG. 2. Thus, the axial location of the stack relative to the magnet is reliably and tightly and permanently configured.

Figure 4:
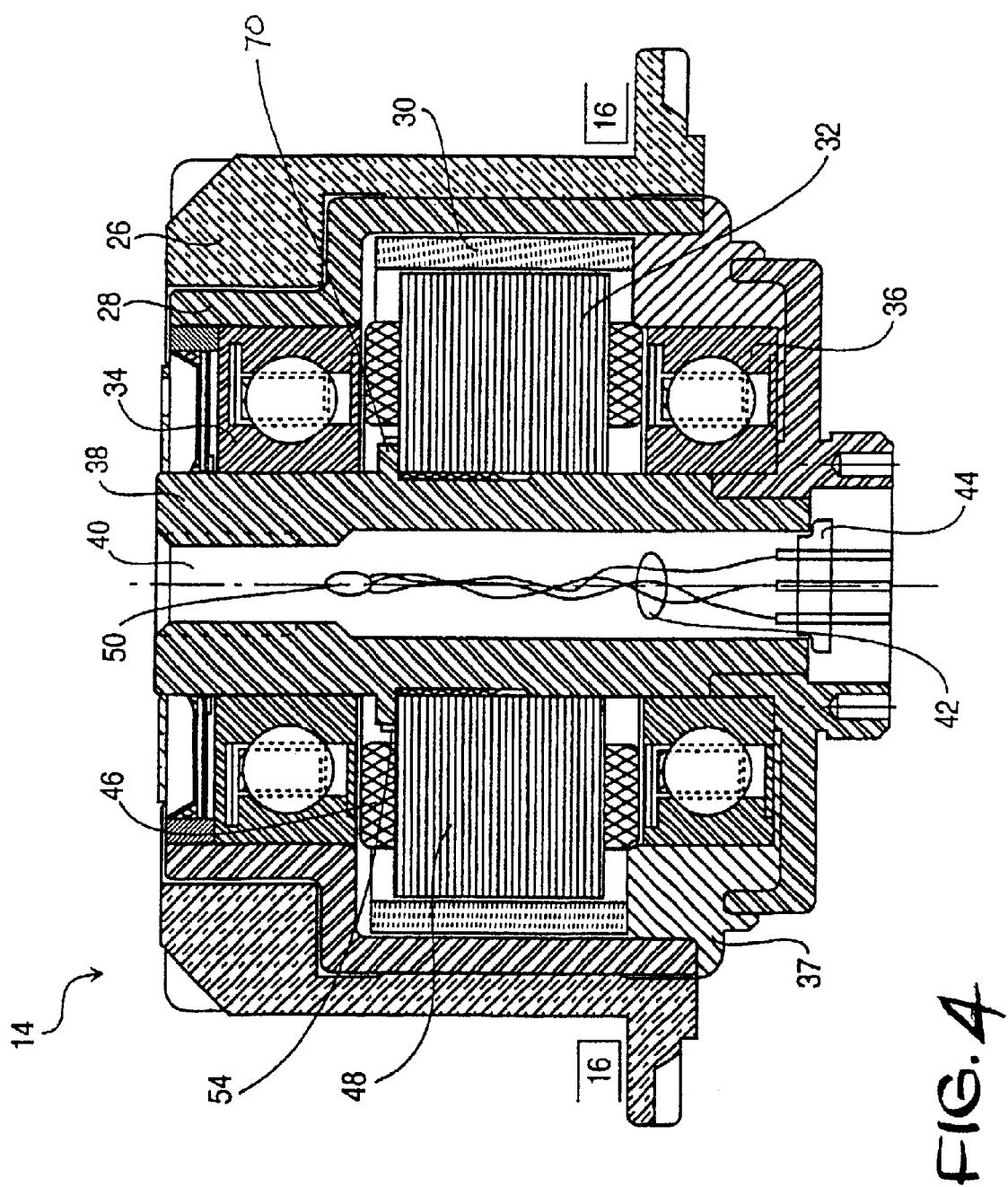
FIG. 4 is a vertical sectional view of a spindle motor showing the stator stack of the invention supported on the shaft.

FIG. 4 illustrates an alternative use of the invention, where the stack rests directly on the shaft. FIG. 4 shows a typical spindle motor design comprising a hub 26 which is supported from upper and lower bearings 34, 36 and combined with backiron 28 supports magnet 30 for rotation outside stator 32. The inner race of the bearings 34, 36 is supported from a shaft 38 which in this instance is a hollow shaft having a cavity extending all or at least partway up the center. This cavity allows wires 42 to be led up from a connector 44 which brings power from an external controller to be applied to the windings 46 of the stator 48. The connection from the hollow center 40 of the shaft to the stator windings is made by feeding the wires through an opening 50 in the shaft out to a ring shaped flexible printed circuit or PCT 54 which is attached to an axial end of the stator yoke generally indicated at 48. In this design, the stator is pushed over the outer diameter of the shaft 38 and against shoulder 70.

The features of the inner yoke of the laminations will serve to both ground the stator and retain the stator in axial position along the shaft against shoulder 70.

Other features and advantages of this invention will be apparent to a person of skill in the art who studies this invention disclosure. Therefore, the scope of the invention is to be limited only by the following claims.

What is claimed is:

1. In a spindle motor comprising a shaft and a hub rotating over the shaft supported by a bearing for rotation relative to the shaft, the hub supporting a magnet radially aligned with a stator supported from an outer surface of the shaft, the stator comprising a plurality of laminations forming a laminated stack comprising a coating over the surface of the stack, the laminations having a circular inner yoke having an inner diameter sized to form an interference fit with a surface within the motor, the yoke further comprising a plurality of lamination features extending radially inward from the inner diameter of the yoke to have the coating scraped from the surface of the features by interference fit with an outer surface over which the stack is located, thereby rigidly establishing an axial, radial and circumferential location of the stator relative to the shaft while grounding the stator to the shaft or base of the motor.

2. A motor as claimed in claim 1 wherein the motor shaft has an outer surface which is fitted within an upright portion of a base of the housing, and the stator stack has an interference fit with an outer surface of the upright portion.

3. A spindle motor as claimed in claim 1 wherein the lamination features are generally semicircular in cross-section.

4. A spindle motor as claimed in claim 3 wherein the lamination features are sized to have an interference fit with the outer surface of the upright section of the base of the casing to scrape the coating from the surface of the features, and wherein the upright section further comprises a radially outward extending shoulder on which the stator laminations rests to axially locate the stator.

5. In a spindle motor comprising a shaft in a hub rotating over the shaft supported by bearing for rotation relative to the shaft, the hub supporting a magnet radially aligned with a stator supported from an outer surface of the shaft, an electrical grounding means incorporated with a inner yoke of stack laminations forming a stator, the grounding means conductively and rigidly fixing the stator stack laminations relative to the magnet while grounding the stator.

6. A motor as claimed in claim 1 wherein the motor shaft has an outer surface and the stator stack has an interference fit with the outer surface of the shaft.

7. A spindle motor as claimed in claim 6 wherein the stator stack_laminations comprise lamination features which are generally semicircular in cross-section.

8. A spindle motor as claimed in claim 6 wherein the shaft further comprises a radially outward extending shoulder on which the stator stack laminations rests to axially locate the stator, the lamination features further restraining axial movement away from the shoulder.

9. A spindle motor comprising:

a shaft;

a hub rotating over the shaft;

a bearing supporting the hub for rotation relative to the shaft;

a magnet supported by the hub;

a stator, radially aligned with the magnet, supported from an outer surface of the shaft, the stator comprising:
   laminated stack, comprising
     a plurality of laminations
     a coating over the surface of the stack,
     a circular inner yoke having an inner diameter sized to form an interference fit with a surface within the motor and a plurality of lamination features extending radially inward from the inner diameter of the yoke to have the coating scraped from the surface of the features by interference fit with an outer surface over which the stack is located, thereby rigidly establishing an axial, radial and circumferential location of the stator relative to the shaft while grounding the stator to the shaft or base of the motor.

* * * * *